Sept. 7, 1965   M. SANGL ETAL   3,205,439
MULTI-PURPOSE ELECTRIC METER FOR MEASURING CURRENT, VOLTAGE, PHASE
ANGLE, FREQUENCY AND RESISTANCE
Filed June 17, 1960   2 Sheets-Sheet 1

INVENTORS
MICHAEL SANGL
ERICH GROSSNER

By: Holte and Holte
ATTORNEYS

Sept. 7, 1965  M. SANGL ETAL  3,205,439
MULTI-PURPOSE ELECTRIC METER FOR MEASURING CURRENT, VOLTAGE, PHASE
ANGLE, FREQUENCY AND RESISTANCE
Filed June 17, 1960  2 Sheets-Sheet 2

INVENTORS
MICHAEL SANGL
ERICH GROSSNER
By: Holte and Holte
ATTORNEYS

United States Patent Office 3,205,439
Patented Sept. 7, 1965

3,205,439
MULTI-PURPOSE ELECTRIC METER FOR MEASURING CURRENT, VOLTAGE, PHASE ANGLE, FREQUENCY AND RESISTANCE
Michael Sangl and Erich Grossner, Erlangen, Germany, assignors to P. Gossen & Co. G.m.b.H., Erlangen, Germany
Filed June 17, 1960, Ser. No. 36,787
Claims priority, application Germany, Sept. 23, 1959, G 28,019
7 Claims. (Cl. 324—115)

The present invention relates to a switchable universal measuring instrument for measuring current, voltage and resistance, as well as for making direct reading measurements of power factor, reactive factor, and active and reactive current.

The object of the invention is to provide a relatively simple economical measuring instrument using a single direct current reading meter having the large number of measuring capabilities mentioned above.

The invention will be fully understood and other objects and advantages of the invention will be apparent from the following description and the drawing in which.

Figure 1:
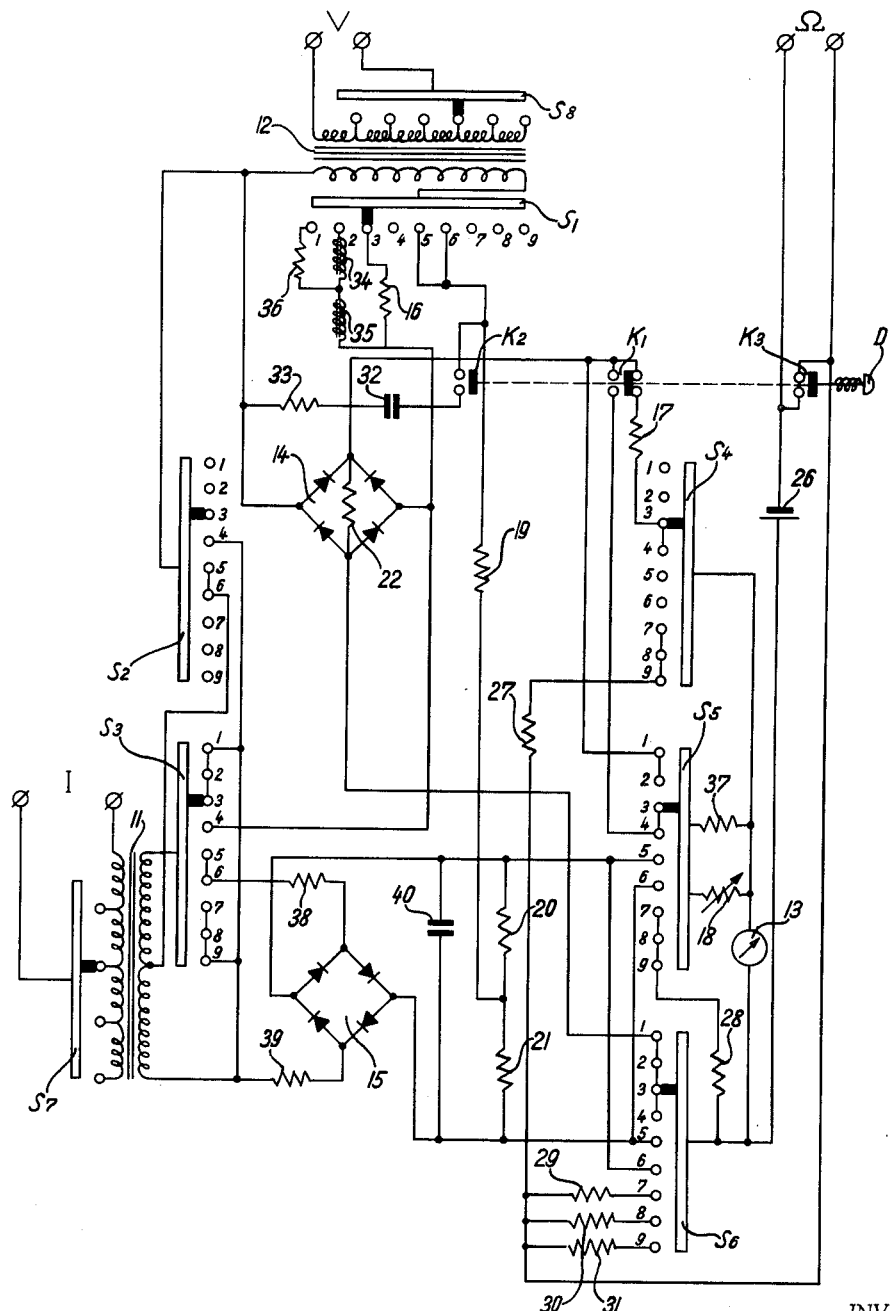
FIG. 1 is a circuit diagram of one embodiment of the invention.
Figure 2:
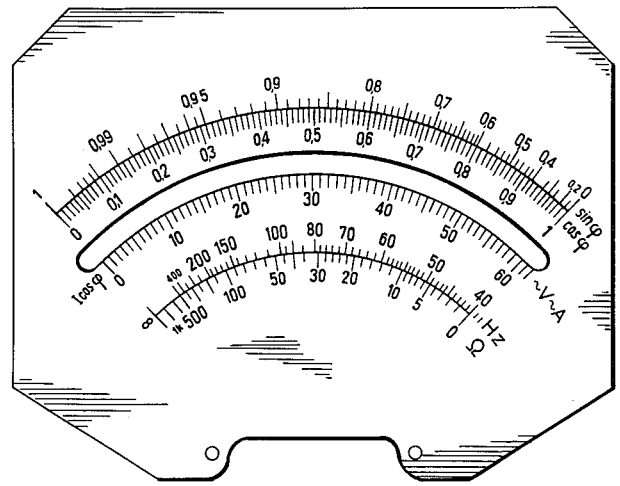
FIG. 2 shows the scale of the meter.

Referring to the drawing, the measuring instrument comprises a current transformer 11, a voltage transformer 12, a meter or indicating instrument 13, bridge rectifier 14, a ring circuit of rectifiers 15, all of which are connected together through unicontrolled switches $S_1$-$S_6$ and the circuit connections which are described below. In addition to switches $S_1$-$S_6$ there is provided a push button switch D with contacts $K_1$-$K_3$. Switches $S_7$-$S_8$ are also provided for connecting to various taps of the primary windings of transformer 11 and voltage transformer 12. The positions of switches $S_1$-$S_6$ for the various types of measurements are:

Switch positions of $S_1$-$S_6$ 1,2—Frequency measurement
3—Voltage measurement
4—Current measurement
5,6—Phase-angle measurement
7,8,9—Resistance measurement Switches $S_1$-$S_6$ are mechanically coupled together and have switch positions 1-9 for selecting the type of measurement to be made. Position 3 is used for measuring voltage. In this position one end of the secondary winding of transformer 12 is connected to one terminal of rectifier 14 and the other terminal of the rectifier is connected through resistor 16 and contact 3 of switch $S_1$ to the other side of the secondary winding. The moving coil meter 13 which is provided with a number of scales, as is common, is connected to the positive pole rectifier 14 through contact 3 of switch $S_6$ and the other terminal of meter 13 is connected to the opposite terminal of rectifier 14 through switch $S_4$, resistor 17 and switch $K_1$. In position 3 the secondary winding of current transformer 11 is short circuited by switch $S_3$. Six voltage ranges can be set by switch $S_8$ and the measured voltages read on the scale of meter 13. A shunt loading resistor 22 is connected across the opposite output terminals of rectifier 14.

When the switches are set in position 4 the instrument operates as an ammeter. The rectifier 14 is again used for rectification and it is then connected to the secondary winding of current transformer 11 through switches $S_2$ and $S_3$. The meter 13 is connected to rectifier 14 in the same way as for the voltage measurement through contacts 4 of switches $S_4$ and $S_6$. Series resistance 17 is so dimensioned that the meter exhibits full scale deflection when rated current flows through the primary winding of current transformer 11. Switch $S_7$ is capable of setting four different current ranges by connecting to different taps on the primary winding of transformer 11.

For measuring the power factor cos $\phi$ the switch position 5 or 6 is used. Switch position 4 is also used to effect presetting for the measurement of the power factor performed in positions 5 and 6. The polarity of the measuring instrument 13 is reversed when switching from position 5 to position 6. This affords the very important practical advantage of eliminating the reversing of the terminals of one of the live power lines and disconnecting the measuring circuits for that purpose, if the measuring instrument deflects to the left because of wrong polarity. For the presetting operation in switch position 4, push button switch D is operated which moves contact $K_1$ and thereby removes resistor 17 and switch $S_4$ from the circuit, and instead connects rectifier 14 through contact 4 of switch $S_5$ and resistors 18 and 37 to the meter 13. The dimensons of fixed resistor 37 are such that its resistance is parallel with the full resistance of adjustable resistor 18 corresponding to the resistance of resistor 17 placed in the circuit for measuring current. Hence, all that need be done to measure the active current is to turn resistor 18 to maximum. The advantage of this procedure over the apparently obvious method of setting resistor 18 to a given value is that greater accuracy can be obtained.

Resistors 38 and 39 are inserted in the lines connecting transformer 11 to rectifier circuit 15. Moreover, capacitor 40 is shunted across the opposite terminals of rectifiers 15 and hence is connected across the terminals of the meter 13 as well. Resistors 38 and 39 are used to match the input impedance of the measuring circuit at the current input terminals during measurement of phase angle in switch positions 5 or 6. This is necessary because the impedances of rectifiers 15 are much lower than the impedances of the elements of the rectifier 14 used in presetting the current. If the input impedance at the terminals I of the transformer 11 were not the same in positions 4-6, this would entail errors in the measurement of the phase angle, because the meter would then be inserted in circuits in which the currents are not kept at steady value. The purpose of capacitor 40 is to short circuit higher harmonics that are produced in the measuring circuit because of the fact that the measured D.C. current appearing at the output of rectifier 15 has the shape of pulsating waves sharply clipped at the beginning and end of the half wave pulses.

When the selector switches are set to position 5 or 6 for measuring the power factor, after meter 13 has been preset, the latter is connected through switches $S_5$ and $S_6$ to a pair of diagonal terminals of rectifier circuit 15. The elements of rectifier circuit 15 are connected as a ring modulator and serve as a phase sensitive bridge. One pair of terminals of rectifier circuit 15 are connected through resistors 38 and 39 and switch $S_3$ to current transformer 11. The biasing potential 4 for ring circuit 15 is supplied from voltage transformer 12 having one end of its secondary winding connected through switch $S_2$ contact 5 or 6 to the center tap of the secondary winding of transformer 11, the other end of the secondary winding of transformer 12 being connected through switch $S_1$ contact 5 or 6 and resistor 19 to the junction between resistors 20 and 21. Resistors 20 and 21 shunt the output of rectifier circuit 15 and the indicating instrument or meter 13. Since the rectifier circuit 15 acts as a ring modulator, its output has an output in accordance with the phase angle between the inputs to the transformers 11 and 12. Since the meter 13 has already been set to full scale deflection by resistor 18, the meter actually reads the value I cos $\phi$ in switch positions 5 and 6; and hence the scale of meter 13 is graduated also in cos $\phi$ and sin $\phi$ or directly in degrees. This measuring technique presupposes that the source impedance of the indicating instrument 13 is the same when the reference current is preset in position 4 as during measurement proper in positions 5 and 6. The load resistance 22 of the rectifier 14, therefore, has the same resistance of the two resistors 20 and 21 together.

Contact $K_2$ connects a capacitor 32, which is in series with a resistance 33, in parallel with the source of control current, which is here designed as an instrument transformer. The operational advantage of this parallel circuit is that the main load at low frequencies is the capacitor, so that the voltage lags behind its original phase by a few degrees. This artifically produced phase displacement increases the capacitive phase angle between current and voltage, and decreases the inductive phase angle. The cos $\phi$ reading obtained during measurement is correspondingly diminished or increased. At higher frequencies the series circuit is predominantly resistive, so that the leakage voltage is increased. These two mechanisms maintain effectiveness of the phase angle test over a very wide frequency range. As is readily seen, this produces no change in the bridge ratios.

The provision of the regulating resistor 18, which is also used for null-point setting in ohmmeter measurements and for current presetting in phase angle measurements, as well as of contact $K_1$ in the push button switch D, makes it possible to include a frequency measurement circuit in the measuring instrument in a simple manner, the principle of this circuit being based upon a frequency dependent impedance. The first two positions, 1 and 2, of the measurement selector switches $S_1$–$S_6$, are used for measuring frequency. For the lower measurement range, say 40–400 cycles, the frequency dependent impedance consists of the inductances 34 and 35 connected in series, while for the higher frequency range it consists of the inductance 35 and the resistor 36 in series with it.

To measure frequency, the selector switches are first turned to "voltage measurement" (switch position 3) and an appropriate voltage measuring range is selected with the voltage selector switch $S_8$. Then the push button switch D is depressed. The direct current produced by the bridge rectifier 14 now no longer flows through the fixed resistor 17 and contact 3 of switch $S_4$ to the upper terminal of meter 13, but rather through contact 3 of the switch $S_5$ and hence through the regulating resistor 18. The shunted fixed resistor 37 has a fairly high resistance and thus may be ignored in this connection. The resistor 18 is then adjusted to set meter 13 to full scale deflection, which is the starting point of the frequency scale, e.g., 40 cycles. After the measurement selector switch is turned to position 1 or 2 to select one of the frequency ranges, the frequency applied can then be read directly from the instrument dial.

One of the positions 7, 8 or 9 is used for measuring resistance, depending upon the measurement range. Measurement itself is made by the volt-ohmmeter method. One of the terminals marked "$\Omega$" is connected through battery 26 to the bottom terminal of meter 13, while the other is connected to the upper meter terminal through the series resistor 27 and, say, the contact 7 of switch $S_4$. Shunted across the indicating instrument through switch $S_5$ is another fixed resistor 28 in series with the regulating resistor 18 mentioned above, whose resistance is dimensioned, together with the dimensioning of the other components of the instrument so that it can be used both for presetting the reference current in the switch position 4 and for correcting the electrical null-point in resistance measurement. The measuring range resistors 29, 30 and 31 are connected through the switch contacts 7, 8 and 9 of the switch $S_6$.

The contact $K_3$ of the push button switch D is used in resistance measurements to bridge the terminals marked "$\Omega$" so that no external short circuit of these terminals is required for null-point correction.

The overall circuit of the instrument and the arrangement of the individual contacts in switches $S_1$–$S_6$ are so chosen that the circuit elements connected in the circuit for the different types of measurement do not affect one another. Thus, for example, resistance can be measured without disconnecting the line to the current or voltage transformer. Moreover, no load is placed on the battery 26, for example, when push button switch D, one pair of whose contacts serves to short circuit the resistance terminals, is actuated to preset the reference current in switch position 4.

What is claimed is:

1. A universal measuring instrument for measuring active and reactive current, voltage, resistance, frequency and power factor, comprising a current meter, a battery, a pair of resistance measuring terminals, a voltage transformer having a secondary and multi-terminal primary, a current transformer having a secondary and a multi-terminal primary, a ring modulator, a center tapped shunt means coupled to the output of said modulator, a bridge rectifier, a ganged multiposition selector switch for selectively connecting circuits to make said measurements, said switch having a first position for coupling the secondary of said voltage transformer to the input of said bridge rectifier and simultaneously coupling the output of said rectifier to said current meter, means for decoupling the current transformer secondary from said bridge rectifier, so that said current meter measures the voltage applied to the corresponding terminals of the primary of the voltage transformer, said switch having a second position for coupling the secondary of said current transformer to the input of said bridge rectifier and simultaneously coupling the output of said rectifier to said current meter through said decoupling means, so that said current meter measures the current applied to the corresponding terminals of the primary of the current transformer, said switch having a third position for coupling the secondary of said current transformer to the input of said ring modulator, for coupling the output of said modulator to said current meter, and for coupling one secondary terminal of said voltage transformer to the input of said modulator the other secondary terminal to the center of the said shunt, variable resistance means coupled to said current meter for adjusting said meter indication to full scale when said switch is in said third position so that said current meter measures the cosine of the angle between the current applied to the primary of said current transformer and the voltage applied to the primary of said voltage meter, said switch having a fourth position for interchanging the input connection to said current meter coupled to said circuits in said third switch position, said switch having a fifth switch position for coupling the secondary of said voltage transformer to said bridge rectifier through inductance means, for coupling the output of said rectifier to said current meter through said variable resistance means whereby the indication on said meter is initially adjusted to full scale by said variable resistance means when said selector switch is in the first position so that when said switch is in said fifth position the indication of said current meter is responsive to the frequency of the voltage applied to the primary of said voltage transformer, said switch having a sixth position for coupling the input to said current meter in series with said battery and said variable resistance means to said pair of resistance terminals momentary switch means for closing said terminals momentarily together to allow said current meter to be set to a null indication by adjustment of said variable resistance means, so that the indication of said current meter will be responsive to the magnitude of the resistance coupled to said open terminals.

2. A measuring instrument in accordance with claim 1, including a capacitor and a resistor connected in series and means for shunting said capacitor and resistor across the secondary of the voltage transformer to check the sign of the angle in said third and fourth selector switch positions.

3. A measuring instrument according to claim 1, comprising a first fixed resistor, said momentary switch means being arranged to connect said fixed resistor in series with the meter when said switches are in the second selector switch position and a second fixed resistor connected directly in parallel with said variable resistance means and having with said variable resistance means a resistance value equal to that of said first fixed resistor.

4. A measuring instrument according to claim 1, wherein said shunt means comprises series connected resistors connected across the output of said ring modulator and a capacitor connected in parallel with said last mentioned resistors across the output of said ring modulator.

5. A measuring instrument according to claim 1, including resistors connected in series between the terminals of the secondary of the current transformer and a pair of input terminals of the ring modulator when in said third and fourth selector switch positions, said resistors having a resistance in combination with the input resistance of said modulator equal to the input resistance appearing across the terminals of the secondary of the current transformer when said selector switch is in the second position.

6. A universal measuring instrument according to claim 1, wherein said momentary switch means includes means for coupling said variable resistance means in series with said meter in said third and fourth selector positions, and for connecting said variable resistance means in parallel with said meter in said sixth selector switch position.

7. A universal measuring instrument according to claim 6, wherein said momentary switch means includes a multi-pole push button switch.

References Cited by the Examiner

UNITED STATES PATENTS

| | | | |
|---|---|---|---|
| 2,282,396 | 5/42 | Cravath | 324—142 |
| 2,583,798 | 1/52 | Rowell | 324—129 |
| 2,783,437 | 2/57 | Yenni | 324—129 |
| 2,792,549 | 5/57 | Bernreuter | 324—115 |
| 3,010,066 | 11/61 | Kwast | 324—78 |
| 3,022,459 | 2/62 | Alper | 324—83 |

FOREIGN PATENTS 404,015  1/34  Great Britain.

WALTER L. CARLSON, *Primary Examiner.*

ELI J. SAX, *Examiner.*